United States Patent
Brormann et al.

(10) Patent No.: US 7,681,378 B2
(45) Date of Patent: Mar. 23, 2010

(54) METHOD AND APPARATUS FOR FILLING BAGS

(75) Inventors: Hubert Brormann, Oelde (DE); Robert Neumann, Staubenhardt (DE)

(73) Assignee: Haver & Boecker OHG, Oelde (DE)

( * ) Notice: Subject to any disclaimer, the term of this patent is extended or adjusted under 35 U.S.C. 154(b) by 0 days.

(21) Appl. No.: 12/065,865

(22) PCT Filed: Dec. 6, 2006

(86) PCT No.: PCT/EP2006/011699

§ 371 (c)(1),
(2), (4) Date: Mar. 5, 2008

(87) PCT Pub. No.: WO2007/065647

PCT Pub. Date: Jun. 14, 2007

(65) Prior Publication Data
US 2008/0236105 A1    Oct. 2, 2008

(30) Foreign Application Priority Data
Dec. 8, 2005    (DE)    ........................ 10 2005 059 004

(51) Int. Cl.
*B65B 3/00* (2006.01)
*B29C 65/02* (2006.01)

(52) U.S. Cl. ........................ 53/469; 53/268; 53/DIG. 2; 156/64; 156/580.1

(58) Field of Classification Search ........................ 53/469, 53/478, 76, 268, 281, 329.2, DIG. 2; 156/580.1, 156/580.2, 64, 73.1
See application file for complete search history.

(56) References Cited

U.S. PATENT DOCUMENTS

| 3,088,343 | A | * | 5/1963 | Kuris et al. | ................... | 228/1.1 |
| 3,426,951 | A | * | 2/1969 | Reimar et al. | ................. | 228/1.1 |
| 3,468,731 | A | * | 9/1969 | Obeda | ........................ | 156/73.1 |
| 3,573,781 | A | * | 4/1971 | Shoh | .......................... | 340/654 |
| 3,920,503 | A | * | 11/1975 | Keeler | ....................... | 156/580.2 |
| 4,313,778 | A | * | 2/1982 | Mims | ........................ | 156/358 |
| 4,373,653 | A | * | 2/1983 | Salzer et al. | ................. | 228/104 |
| 4,517,790 | A | * | 5/1985 | Kreager | ....................... | 53/552 |
| 4,581,873 | A | * | 4/1986 | Knuppertz et al. | ......... | 53/374.8 |
| 4,631,685 | A | * | 12/1986 | Peter | .......................... | 700/212 |
| 4,688,370 | A | * | 8/1987 | Dighton et al. | ............... | 53/469 |
| 4,767,492 | A | * | 8/1988 | Fukusima et al. | ......... | 156/580.2 |
| 5,507,904 | A | * | 4/1996 | Fisher et al. | ................. | 156/252 |
| 5,620,542 | A | * | 4/1997 | Avila et al. | .................. | 156/73.1 |
| 5,642,606 | A | * | 7/1997 | Ohlsson | ........................ | 53/565 |
| 6,780,263 | B2 | * | 8/2004 | Delisle | ......................... | 156/64 |
| 2004/0163360 | A1 | * | 8/2004 | Van Rens et al. | ............ | 53/133.4 |

FOREIGN PATENT DOCUMENTS

| DE | 20206429 U1 | 6/2002 |
| DE | 20305725 U1 | 7/2003 |
| WO | WO96/01208 A | 1/1996 |

* cited by examiner

*Primary Examiner*—Paul R Durand
(74) *Attorney, Agent, or Firm*—Pearne & Gordon LLP

(57) ABSTRACT

Method and apparatus for filling bags wherein bags are filled one by one with a filling material and thereafter closed by means of an oscillating structure of an ultrasonic welding device. A parameter for the oscillating behavior of the oscillating structure is determined at no-load between closing two bags.

11 Claims, 2 Drawing Sheets

METHOD AND APPARATUS FOR FILLING BAGS

Figure 1:
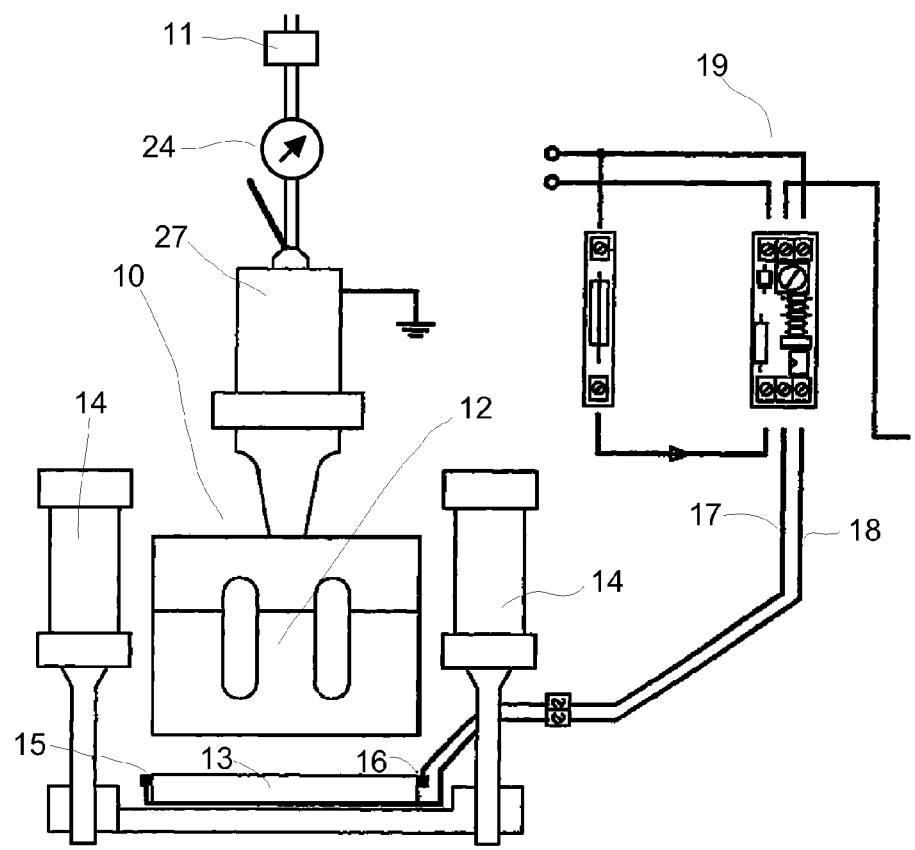

The invention relates to a method and an apparatus for filling bags, in particular valve bags. However, the invention may be used for filling bags other than valve bags. The invention will be described below exemplarily with reference to the filling of valve bags.

In the prior art, different filling machines have become known. For example, filling machines have become known which are equipped with one or multiple filling elements in the shape of e.g. filling pipes onto which the valve bags to be filled can be placed and which are equipped with closing devices employing the ultrasonic welding process. Each ultrasonic welding device comprises in particular one anvil and one sonotrode.

Said filling machines may be configured e.g. as so-called rotary filling machines with the individual filling assemblies rotating about one common, vertical axis. The filling machines may be configured as stationary filling machines wherein multiple filling machines may be arranged in series. Such machines are referred to as series packaging machines. In order to achieve that after filling, the bag contents cannot escape through the valve, the closing devices close the valves to be dustproof. Thereafter the bags are thrown onto a conveyor. Such a filling machine has become known e.g. by DE 202 06 429 U1.

One drawback of the filling machines known in the prior art is that the oscillating structure of the closing devices comprising the sonotrode is subjected to wear which is not necessarily in linear correlation with time or the count of welding processes performed.

If the stress tolerance limit is exceeded, the sonotrode material may tear locally. This will adversely affect the entire oscillating behavior of the sonotrode and in particular in the area of the tear. It may therefore happen that in these places the weld seam of the bag to be closed is deficient (or locally absent) and is prone to bursting and may result in the entire bag falling off. Also it is undesirable if a hole forming at the weld seam causes some of the filling material to escape, thus contaminating e.g. the storage room or the showroom.

Therefore it is the object of the invention to provide a more reliable method and a more reliable apparatus.

This object is solved by a method having the features of claim 1 and by an apparatus having the features of claim 13. Preferred embodiments are the subjects of the subclaims.

The inventive method according to claim 1 serves to fill bags wherein bags are filled with a filling material one by one and thereafter closed by means of an oscillating structure of an ultrasonic welding device, wherein a parameter for the oscillating behavior of the oscillating structure is determined at no-load operation between closing two bags.

The invention offers considerable advantages. Deficiencies in weld seams are largely prevented since the oscillating behavior of the oscillating structure is monitored at no-load between closing two bags. This allows to recognize changes in the oscillating behavior early on, allowing conclusions to be drawn about structural changes in the oscillating structure and in particular in the sonotrode. As the sonotrode structure changes locally, its resonance response will change. Thus the oscillating behavior of the sonotrode and of the entire oscillating structure will change. The changes in the oscillating behavior can be detected by measuring. As such changes are detected, an alarm signal may be emitted or the filling and welding of bags may be stopped until the changed or defective element is replaced.

Closing with respect to the closing of bags is understood to mean welding shut.

One considerable advantage is that in checking the oscillating behavior of the oscillating structure at no-load, external influences are largely avoided so as to permit a reproducible evaluation of the oscillating behavior. Neither the bag to be filled nor any residual material which may be lying on the anvil or the sonotrode can substantially affect the oscillating behavior of the oscillating structure. When closing a bag, however, any material present inbetween may affect the oscillating behavior e.g. if any filling material is present between the sonotrode and the anvil. For this reason the oscillating behavior during welding per se does not represent an explicit criterion for the current state of the oscillating structure.

The inventive checking of the oscillating behavior of the oscillating structure at no-load between closing two bags provides valuable indications of any changes of the sonotrode for the negative. Exchanges can be made early on so as to prevent damage from occurring. When structural changes occur in an oscillating structure, said oscillating structure being in a state in which according to the invention initial changes can be determined, such sonotrode may as a rule continue welding for a few or even a number of bags without showing adverse effects. If operation is continued, however, the oscillating behavior of the oscillating structure will continuously deteriorate until defects are large enough to result in an inadequate weld seam or other defects become obvious.

To maintain cleanliness in the environment of the filling machine and the valve bags, any dust which may be escaping in taking off is vacuumed off. In this way the operators are also protected. Therefore each filling element is preferably provided with its own suction apparatus.

Before a bag is closed, a contact or short-circuit test is preferably performed. To this end, a more specific embodiment of the apparatus or the closing device provides for the ultrasonic welding device to be equipped with a monitoring device for determining before activating the closing device whether the bag valve area is currently between the anvil and the sonotrode. This occurs by so-called contact or short-circuit monitoring wherein in the absence of a bag, a contact is triggered or a short-circuit generated. With the corresponding method, the oscillating structure will not be activated unless a bag is present.

This offers considerable advantages since the filling machines in question are also used for bagging products which involve the risk of forming ignitable mixtures. Such a contact or short-circuit monitoring considerably increases the safety measures for avoiding explosions.

Furthermore a checking device may be provided for verifying if no bag is present. Then, a signal is fed into the control such that no closing operation will be initiated. The checking device may be referred to as an anvil controller. The checking device may for example consist of two electrically conductive wires arranged at opposite sides of the anvil so as to permit conclusions from changes in resistance whether or not a bag to be closed is present. In the corresponding method only the anvil controller is checked before the oscillating structure is activated.

It may furthermore be provided to monitor the checking device itself which may for example be defective due to a broken conductor or wire. To further enhance safety it is therefore provided for each closing device to be equipped with a functional checking device in that after a specified count of closing operations the checking device performs a functional check. This preferably occurs in that the anvil is displaced into its operational position or closing position with no bag between the anvil and the sonotrode. No closing operation should then be initiated.

Preferred more specific embodiments provide for a parameter to be determined for the oscillating behavior at no-load after closing a predetermined count of bags.

This more specific embodiment is advantageous since the oscillating behavior is not checked after each oscillating action but only after a given number of oscillating actions. This permits to save the time required for checks at no-load. The welding typically takes between approximately 0.1 and 0.8 seconds, in one specific example it is 0.4 seconds. The same duration may be approximately assumed for determining the parameter at no-load. Now, if checking does not occur after each bag, time may be saved on the whole. It is preferred to perform checks e.g. after every two, three, four, five, six, seven, eight, nine or ten bags or else at other regular or random intervals.

Checking performed at certain intervals allows obtaining a high level of safety. More specific embodiments may provide for the checking intervals to be set manually or automatically, e.g. in relation to the product to be bagged.

A measure of the oscillating behavior of the oscillating structure is preferably determined during the filling of a bag. Checking the oscillating behavior of the oscillating structure during closing of a bag is performed in addition to checking at no-load. Such checking preferably occurs during welding of each bag or else only at regular or irregular intervals.

Determining the measure for oscillating behavior during welding per se does not provide reliable values since e.g. the quality of the bag to be sealed has an influence on the oscillating behavior. Structural changes in the oscillating structure also lead to changes in the oscillating behavior. However, any dust or other particles which may be present between the layers to be welded may also have considerable influence on the oscillating behavior. Changes in the oscillating behavior of the oscillating structure during welding may therefore possibly be caused by product particles or other contamination in the welding gap. Thus, a changed measure of the oscillating behavior during welding is per se only an indication but no reliable evidence of a changed sonotrode. An anomaly in welding is, however, a practical criterion for possibly initiating further checking. It is therefore preferred to perform at least one test at no-load at the latest as anomalies occur in welding.

Preferred more specific embodiments of the method provide for a parameter of the oscillating behavior at no-load to be determined in particular at the precise time when the measure of oscillating behavior determined during closing of a bag exceeds a predetermined deviation from a standard value. It is preferred to determine a parameter for the oscillating behavior at no-load at regular intervals and additionally at the precise time when the measure of oscillating behavior determined during closing of a bag deviates from the standard value by a predetermined amount.

Such deviation is an indication of a structural change of the sonotrode. Although such a deviation may have other causes as described above, deviations tend to occur in particular when the sonotrode is damaged, e.g. exhibiting structural changes. When, after such a deviating measure occurs, the parameter at no-load is determined, it can immediately be checked whether or not this was caused by changes at the sonotrode.

In all of the configurations described above the method is in particular provided for filling bags with ignitable, thus including explosive, materials. The method may be carried out in particular with ignitable, loose bulk materials or particulates.

The materials conceivable and preferred are in particular, organic substances in general such as flour or powdered starch or the like, or coal or graphite or two-component products. Processing minerals or construction materials or cement is likewise conceivable. As a rule the products are supplied in loose bulk as powders or granules.

Mixtures of air with inflammable, organic or anorganic particulates such as coal, flour, wood, cocoa, coffee, starch, aluminum or cellulose dust may be explosive in particular conditions.

While gas explosions only occur if the gas-oxygen ratio is in the ignitable range and the ignition source delivers the substance-related minimum ignition energy at the ignition temperature, dust explosions are only triggered if further general conditions are fulfilled: The dust must be finely dispersed and ignitable, furthermore the dust particle size must remain beneath the substance-related maximum size. This factor may be fulfilled when bagging such materials.

Another decisive criterion for ignitability is the oxygen content of the air. The ignition source may be a number of electrical or mechanical effects at the proper temperature and energy density, in particular a spark emitted by the sonotrode may already be sufficient for an ignition.

The processing and bagging of explosive materials is thus subjected to rigorous safety standards. Other than sufficient venting so as to minimize the dust content in the air, spark formation which may occur e.g. at tears in the sonotrode material must be avoided. The invention considerably contributes to avoiding risks in processing explosive materials since the forming of ignition sparks at the sonotrode is avoided so as to further contribute to increasing safety.

To determine the parameter of the oscillating behavior at no-load and/or to determine the measure of the oscillating behavior during welding of the oscillating structure, preferably at least one measurement value, in particular multiple measurement values are captured.

Advantageous more specific embodiments provide for at least one measurement value for the oscillating behavior to be derived by way of at least one electrical measurement value. Preferably a sensor is provided to detect the current electrical data of the oscillating structure at no-load and if required additionally at welding a bag.

The at least one measurement value for the oscillating behavior is in particular derived from the power consumption and/or energy consumption of the oscillating structure and/or from the current or voltage pattern and/or the phase and/or the frequency. Preferably a sensor is provided for this purpose which detects e.g. the running power consumption of the oscillating structure or one of the other magnitudes at no-load and/or at welding a bag.

Evaluation may be based e.g. on the maximum voltage or the maximum current determined at no-load, i.e. during running without load, i.e. while the sonotrode oscillates freely. The measure for the oscillating behavior may likewise be determined based on the maximum voltage or the maximum current during closing. It is also conceivable to use for evaluation, average values or values integrated over time. The measurement value for the oscillating behavior can in particular be derived from the energy consumption. It is also conceivable to determine the electrical resistance of the sonotrode which may change along with structural changes. It is in particular conceivable and preferred to evaluate the phase, the frequency and/or the amplitude of the oscillation or of the voltage or of the current, and of the power.

It is advantageous to take into account for evaluation the power or the energy since in the case of structural changes in the sonotrode the resonance frequency will no longer match the oscillating structure and the energy demand increases so as to have the sonotrode oscillate at the intended frequency. For this reason, structural changes and the like can be readily detected.

In all of the embodiments of the method it is preferred to compare the measurement values against calibration values.

In the case of a considerable deviation an alarm signal is preferably emitted. In particular if a predetermined deviation is exceeded, an alarm signal is emitted.

The apparatus according to the invention is in particular configured as a filling machine for filling bags and in particular it serves to fill valve bags. The filling machine comprises at least one filling element for filling the bags and at least one ultrasonic welding device for sealing the bags. The ultrasonic welding device comprises at least one oscillating structure. At least one sensor device is provided. The apparatus can be controlled by way of a control device, said control device being structured such that by means of the control device and the sensor device, a parameter can be determined for the oscillating behavior of the oscillating structure at no-load.

The filling element may be configured e.g. as a filling pipe, comprising a filling turbine for filling the valve bags, or a filling opening is provided as the filling element to fill the bag e.g. from above.

The oscillating structure comprises at least one sonotrode. The oscillating structure in particular comprises a converter to convert the—usually—electrical oscillations into mechanical oscillations. There is furthermore preferably provided at least one amplitude transformation device and at least one sonotrode.

The ultrasonic welding device preferably substantially consists of the assemblies generator, anvil, and sonotrode.

The sonotrode consists of titanium, at least in part. The sonotrode or all of the sonotrodes consist in particular at least partially and in particular substantially entirely of titanium or a titanium alloy such as they are used in aircraft construction. Titanium sonotrodes offer considerable advantages. Thus, titanium sonotrodes permit a particularly high oscillating amplitude e.g. in the range of up to 70 µm or more. Conventional sonotrodes of a normal steel, however, can withstand continuous amplitudes of only 30 or 40 µm.

The weight of the oscillating structure is preferably between 3 kg and 7 kg, in particular approximately 5 kg.

To determine the data such as e.g. the frequency and/or amplitude or the electrical data such as power and/or energy and/or voltage and/or current and/or phase position and the like, at least one electrical evaluation sensor is preferably provided.

Proper operation requires a functional suction device. Therefore it is preferably provided that the suction device and the ultrasonic welding device can be tested by means of checking devices operating independently from one another.

The checking device for the suction apparatus comprises flow sensors which check for example the air flow rate. If the actual rate stays below said minimum rate or if a core break is established, corresponding measures are initiated by way of the evaluation electronics. It is advantageous for such errors to be displayed optically.

The flow controller or controllers should be configured to be mounted adjacent to the region of the closing device. It may be expedient for the sonotrode to be only activated for a specified period. Therefore it is provided that if a predefined duration is exceeded, activation of the sonotrode is switched off via a timing device, preferably a timing relay. In this way the generation of heat beyond an acceptable level can be prevented.

Further advantages and applications can be taken from the exemplary embodiment described below with reference to the Figures.

Figure 2:
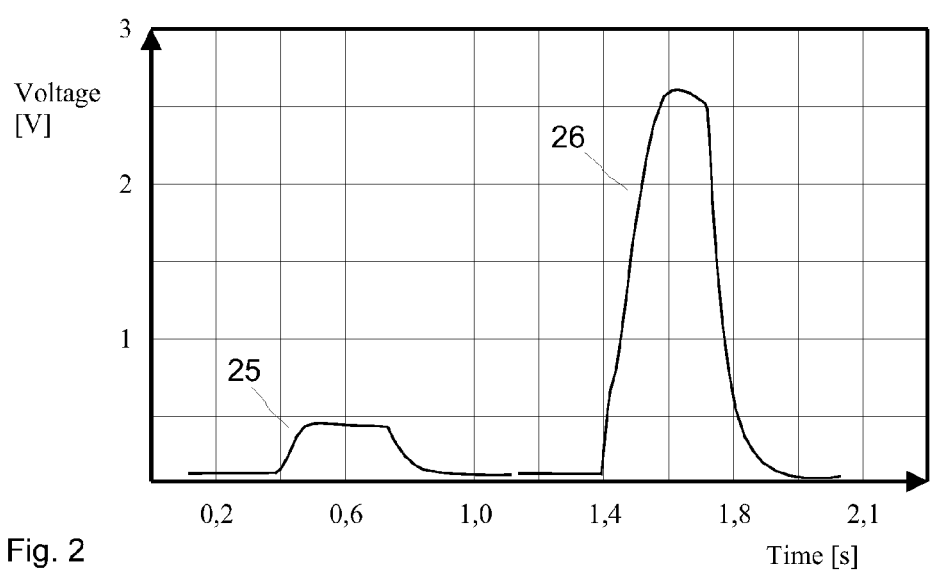
Figure 3:
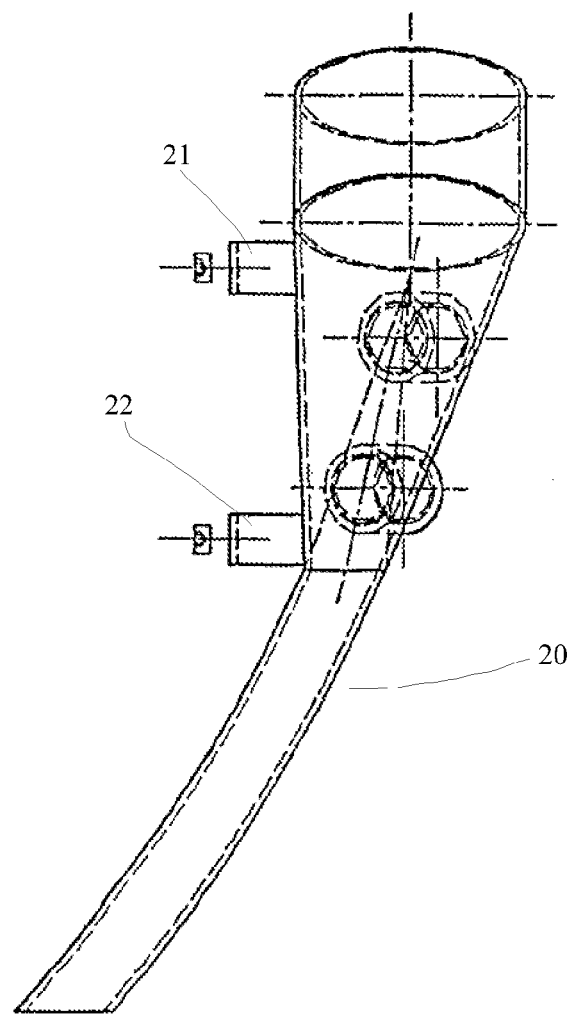

These show in:

FIG. 1 a simplistic, schematic illustration of the ultrasonic welding device,

FIG. 2 the time pattern of the voltages supplied by the evaluation electronics in the case of a functional and a damaged sonotrode, and FIG. 3 the suction device.

FIG. 1 illustrates a simplistic, schematic illustration of the ultrasonic welding device 10, sealing a filled bag by way of ultrasonic oscillations of the oscillating structure.

The ultrasonic welding device 10 comprises a generator 11, a stationary sonotrode 12 and an anvil 13 which can be placed against the sonotrode 12 so as to quasi form an abutment.

The function of the closing device will now be described. To close the valves of the filled valve bags, the valve regions are brought into the gap between the sonotrode 12 and the anvil 13. The anvil 13 is displaced by means of two piston-cylinder units 14, wherein the valves are closed by clamping the corresponding portion of the valve bags.

In the absence of a bag, for example because it burst during filling, the anvil 13 will come into direct contact with the sonotrode 13 wherein the electronic contact is assessed as a signal to not trigger a welding operation.

Additionally, the closing device is equipped with another checking device which in the illustrated exemplary embodiment substantially consists of two wires 15, 16 with a corresponding evaluation in the control device 19. The wires 15, 16 are installed at the sides of the anvil 13. Said wires 15, 16 are in connection with a voltage source via two conductors 17, 18 made of an electrically conductive material. The conductors 17, 18 are connected with an evaluator 19 which may form part of the control, such that the anvil 13 is not displaced in the direction of the sonotrode 12 if a corresponding signal has established that no valve bag was inserted in the gap.

The filling machine thus provides for double checking whether or not a bag has been placed. Furthermore, according to the invention the functional ability of the sonotrode is checked at no-load on a regular basis. This quite considerably increases the safety against ignition of inflammable mixtures while concurrently attempting to prevent the forming of any inflammable mixture.

Generation of the ultrasonic frequency occurs by the following steps, although it may be performed by way of other methods:

Firstly, the existing alternating voltage is rectified.

Thereafter the direct voltage is chopped with the target frequency of a corresponding frequency at 20 kHz or else 35 kHz.

The resulting signal is converted by way of a sine wave converter.

In the converter, an amplitude between approximately 4 µm and 15 µm is generated by way of piezoelectric elements and amplified by the resonator.

Although the present ultrasonic welding is in particular a method for joining plastics, metals may be welded as well. As occurs in all other welding processes, the material must be welded onto the weld junction by applying heat. In ultrasonic welding it is generated by way of high-frequency, mechanical oscillation. The heat required for welding is generated between the surfaces of the bag valve to be welded together by way of molecular and boundary layer friction in the bag valve surfaces. Ultrasonic welding belongs in the category of friction welding.

The electric power required for operation is supplied to the generator 11 via a connection line which in this exemplary embodiment generates from the alternating voltage, the required high-frequency alternating current at 20 or else 35 kHz. Other configurations may provide for the high-frequency signal to be generated in the control device 19 which is then in connection with the sonotrode.

In the present supply line an evaluation sensor 24 is arranged for detecting the voltage drawn from the generator over time. Other configurations may provide, additionally or alternatively, a current strength sensor and/or a power sensor and/or an energy sensor and/or a phase and/or frequency sensor.

By means of the sensor 24 the power drawn from the generator is determined during idling at no load. For this purpose, the sonotrode in the initial position without a bag is induced to oscillate and the power required therefor is determined.

Comparison of the currently measured data of the unloaded sonotrode occurs against standard values, i.e. against measurement values of an unloaded, same-model sonotrode in brand-new condition or against values from factory standards. It is also conceivable to perform an initial measurement for each sonotrode after installation, which values then serve as standard values.

In the case that deviations occurring exceed the typical range, an optical, acoustical or other warning signal is emitted. If the deviation exceeds a predetermined limit value, filling the bags is stopped since this indicates the high probability of a structural defect of the sonotrode, e.g. crack formation. The edges of large cracks might—also due to increased friction—lead to local temperatures of above 1000° C. during welding.

The method according to the invention, however, permits welding by means of a certainly fully functional sonotrode in each welding operation. Changes in oscillating behavior may be detected after each welding operation. Following this, the next welding operation is allowed or prohibited.

FIG. 2 shows the voltage patterns of two sonotrodes over time. The graph 25 shows a fully functional sonotrode, while the graph 26 illustrates a damaged sonotrode. The stimulation period was approximately 0.4 seconds in both cases. It is conspicuous that with the sonotrode damaged, graph 26, the evaluation electronics apply a maximum voltage of approximately 2.5 Volts while with the sonotrode fully functional, graph 25, a maximum voltage of only approximately 0.4 Volts is generated. The voltage difference is approximately 2 Volts at a factor between of approximately six, such that damaged sonotrodes can be readily detected.

By way of this method, sonotrodes having slight, not yet visible defects, can be recognized reliably and then discarded. In particular in processing inflammable, explosive materials, the invention thus offers quite considerable advantages since spark formation caused by defective sonotrodes can be avoided.

For bagging other materials the invention offers the advantage of more reliable weld seams since locally defective sonotrodes result in inferior welding results.

FIG. 3 shows the suction pipe 20 which is allocated to each closing device 10. The portion of the suction pipe 20 allocated to the closing device 10 is flat in cross-section. In this way the width is sufficiently large to maintain the ambience of the closing device 10 substantially dust-free.

The flat part is followed by a conical center portion which is followed by a cylindrical end portion. The suction pipe 20 is equipped with a control device for monitoring the flow. This may occur by means of two flow sensors 21, 22, mounted to the center portion at a distance from one another. If the flow rate falls beneath a specific level, a signal is emitted such that the closing operation is not initiated.

Furthermore the control unit has another monitoring module installed inside to limit the actuation period of the sonotrode 12 to a predefined value. Said value is less than 1 second. If said predefined value is exceeded, welding is stopped. A control unit monitor displays the defects optically so corresponding measures can be initiated to remedy the defect.

REFERENCE NUMERALS 10 closing device
11 generator
12 sonotrode
13 anvil
14 piston-cylinder unit
15 wire
16 wire
17 conductor
18 conductor
19 control device
20 suction pipe
21 flow sensor
22 flow sensor
23 electric connection line
24 power sensor
25 voltage pattern
26 voltage pattern
27 converter

The invention claimed is:

1. A method for filling bags wherein bags are filled one by one with a filling material and thereafter closed by means of an oscillating structure of an ultrasonic welding device, wherein a parameter for the oscillating behavior of the oscillating structure is determined at no-load between closing two bags and wherein at least one checking device is provided for verifying if no bag is present, and wherein a measure of the oscillating behavior of the oscillating structure is determined during the filling of a bag.

2. The method according to claim 1, wherein a short-circuit test is performed before the bag is closed.

3. The method according to claim 1, wherein a parameter for the oscillating behavior is determined at no-load after closing a predetermined count of bags.

4. The method according to claim 1, wherein a parameter of the oscillating behavior at no-load is determined when the measure of oscillating behavior determined during closing of a bag shows a predetermined deviation.

5. The method according to claim 4, wherein if a predetermined deviation is exceeded, an alarm signal is emitted.

6. The method according to claim 1 for filling bags with explosive materials.

7. The method of claim 6, wherein said explosive materials are ignitable, loose bulk materials or particulates.

8. The method according to claim 1, wherein a measurement value for the oscillating behavior is derived by way of at least one electric measurement value.

9. The method according to claim 8, wherein the measurement value for the oscillating behavior is derived from:
   a) the power consumption of the oscillating structure; or
   b) the energy consumption of the oscillating structure; or
   c) the power consumption and the energy consumption of the oscillating structure.

10. The method according to claim 8, wherein the measurement values are compared against calibration values.

11. A method for filling bags wherein bags are filled one by one with a filling material and thereafter closed by means of an oscillating structure of an ultrasonic welding device, wherein a parameter for the oscillating behavior of the oscillating structure is determined at no-load between closing two bags and wherein at least one checking device is provided for verifying if no bag is present, and wherein a measurement value for the oscillating behavior is derived by way of at least one electric measurement value, and wherein the measurement value for the oscillating behavior is derived from:

a) the phase position at no-load; or b) the frequency at no-load; or c) the phase position and the frequency at no-load.

* * * * *